UNITED STATES PATENT OFFICE.

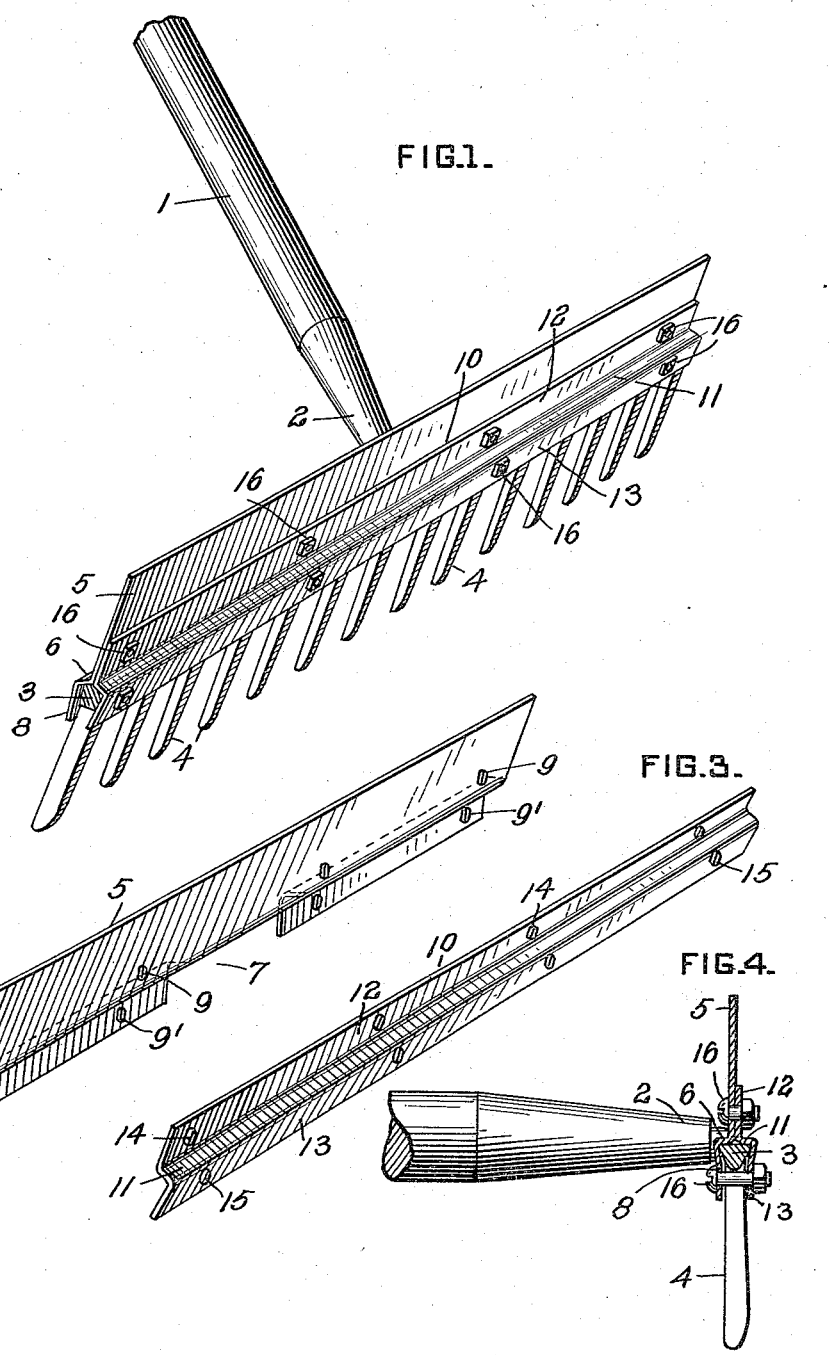

LOUIS H. HARTMAN, OF PITTSBURGH, PENNSYLVANIA, ASSIGNOR OF ONE-FOURTH TO JAMES H. CANFIELD AND ONE-FOURTH TO CHARLES A. SWEADNER, BOTH OF PITTSBURGH, PENNSYLVANIA.

RAKE ATTACHMENT.

1,151,584.  Specification of Letters Patent.  Patented Aug. 31, 1915.

Application filed January 29, 1915. Serial No. 5,018.

*To all whom it may concern:*

Be it known that I, LOUIS H. HARTMAN, a citizen of the United States, residing at Pittsburgh, in the county of Allegheny and State of Pennsylvania, have invented certain new and useful Improvements in Rake Attachments, of which the following is a specification.

The prime object of the present invention is to provide a simple and efficient attachment for rakes that may be readily applied to and detached from the rake, the attachment being designed to be used for all the purposes for which an ordinary hoe is employed.

In the accompanying drawings which illustrate an application of my invention, Figure 1 is a perspective view of a rake with my attachment applied thereto; Fig. 2 is a perspective view of the blade member of the attachment; Fig. 3 is a perspective view of the clamping member of the attachment; and Fig. 4 is a part elevational and a part sectional view, the section showing the central portion of the rake head with my attachment applied thereto.

Referring to the drawing, 1 designates the rake handle, 2 the connection between the rake head 3 and the handle, and 4 rake teeth of the usual construction formed integral with the rake head.

My rake attachment, as illustrated and as preferred, comprises a blade member 5 having a laterally extending ledge or seat 6 preferably extending throughout the length of the blade member and centrally notched as indicated by 7. Projecting downwardly from this ledge or seat 6 and preferably extending throughout the length of the blade, I provide a flange 8, said flange also being cut away at its central part. Blade member 5 is further provided with a plurality of openings 9 and the flange thereof with openings 9′, said openings 9 and 9′ being preferably of slotted form. The ledge or seat 6 of the blade member is adapted to rest upon a portion of the head of the rake, and is securely attached thereto by means of a clamping member 10.

Clamp member 10 is provided with a seat or ledge 11 corresponding with the ledge of the blade member except that it is not cut away or notched. The clamp member is formed with an upwardly extending flange 12 projecting from the inner edge of the ledge or seat 11 and with a downwardly projecting flange 13. Each of the flanges of the clamp member is provided with slightly elongated slots 14 and 15 corresponding with the slots 9 and 9′ of the blade member and adapted to register with one another when the members are applied to the rake. The ledge or seat of the clamp member is adapted to rest upon the upper surface of the head of the rake with its flange 12 abutting against the body of the blade member.

Both of the members are preferably made of suitable sheet steel material and are of such a character that they may be readily formed by proper dies. The clamp member is of such form as to reinforce both the head of the rake and the blade member of the attachment when in operative position, said members being secured together by means of screws or other suitable fastening devices 16 passed through the registering openings of the two members.

As will be seen by referring to Figs. 1 and 4, the plate portions of the two members 5 and 10 are of different widths, the member having the portion of greatest width (member 5) being on the handle side of the rake, this member having its flanged portion cut away to accommodate for such handle. As a result the attachment has all of the advantages of the single blade type of implement such as a hoe, and at the same time is reinforced throughout its length by the plate portion of the other member, the reinforcing being at the point where the greatest liability of bending under strain would be provided. Since the flanged portions of these members overhang the base of the rake teeth, it will be readily understood that the positioning of the members on the rake provides a rigid construction of a character substantially equivalent to an integral arrangement of rake and hoe construction; at the same time, this arrangement is such as to permit of the attachment being quickly removed, thus leaving the implement in its rake form.

What I claim is:—

1. An attachment adapted to convert a rake into a combined implement, comprising a pair of members each having a plate portion adapted to facially contact with a similar portion of the other member, said portions being of different widths, each of said members having a flanged portion adapted to overhang the base of the rake teeth, and means for securing the members together with the flange portions extending on opposite sides of the base of the rake teeth, the member having the plate portion of greater width extending on the handle side of the rake teeth, said member having its flanged portion cut away to accommodate for the handle connection with the rake.

2. An attachment adapted to convert a rake into a combined implement, comprising a pair of members each having a plate portion adapted to facially contact with a similar portion of the other member, said portions being of different widths, each of said members having a flanged portion adapted to overhang the base of the rake teeth, and means for securing the members together with the flange portions extending on opposite sides of the base of the rake teeth, said means embodying connecting members securing the members together above and below the rake head.

In testimony whereof I affix my signature in presence of two witnesses.

LOUIS H. HARTMAN. [L. S.]

Witnesses:
S. A. McFARLAND,
W. G. DOOLITTLE.

Copies of this patent may be obtained for five cents each, by addressing the "Commissioner of Patents, Washington, D. C."